United States Patent
Prouse

(10) Patent No.: US 11,428,356 B2
(45) Date of Patent: Aug. 30, 2022

(54) HOSE CONNECTOR APPARATUS

(71) Applicant: Anna Widdicombe, Columbus, MT (US)

(72) Inventor: Jerry Prouse, Columbus, MT (US)

(*) Notice: Subject to any disclaimer, the term of this patent is extended or adjusted under 35 U.S.C. 154(b) by 0 days.

(21) Appl. No.: 17/210,570

(22) Filed: Mar. 24, 2021

(65) Prior Publication Data

US 2021/0324985 A1 Oct. 21, 2021

Related U.S. Application Data

(60) Provisional application No. 63/006,268, filed on Apr. 7, 2020.

(51) Int. Cl.
*F16L 33/12* (2006.01)

(52) U.S. Cl.
CPC .................................. *F16L 33/12* (2013.01)

(58) Field of Classification Search
CPC ............ F16L 33/12; F16L 37/20; F16L 37/18
See application file for complete search history.

(56) References Cited

U.S. PATENT DOCUMENTS

| | | | | |
|---|---|---|---|---|
| 293,453 A * | 2/1884 | Hamer | F16L 37/20 | 285/349 |
| 297,880 A * | 4/1884 | Riper et al. | F16L 37/20 | 285/330 |
| 476,711 A * | 6/1892 | Whelan | F16L 37/20 | 285/349 |
| 543,871 A * | 8/1895 | Houze | F16L 37/20 | 285/344 |
| 762,777 A * | 6/1904 | Vernon | F16L 37/20 | 285/331 |
| 935,587 A * | 9/1909 | Casey | F16L 37/20 | 285/259 |
| 969,019 A * | 8/1910 | Wilson et al. | F16L 37/20 | 285/332 |
| 1,361,856 A * | 12/1920 | Heininger | F16L 37/20 | 285/311 |
| 1,369,162 A * | 2/1921 | Boone | F16L 37/20 | 285/8 |
| 1,793,015 A * | 2/1931 | Roos | F16L 37/20 | 285/330 |
| 1,865,462 A * | 7/1932 | Etnyre | F16L 37/20 | 285/332 |
| 1,941,856 A * | 1/1934 | Fraley | F16L 37/20 | 285/80 |
| 2,133,558 A * | 10/1938 | Miller | F16L 37/20 | 285/364 |

(Continued)

*Primary Examiner* — David Bochna

(57) ABSTRACT

A hose connector apparatus for quick and easy dripless hose connection includes a first connector having a first inner end, a first outer end, and a first sidewall. The first outer end attaches to a first hose. The first inner end has a receiving cavity. A male clamp bracket is pivotably coupled to the first sidewall. A female clamp bracket is pivotably coupled to the male clamp bracket and has a female bracket distal end. A second connector has a second inner end, a second outer end, and a second sidewall. The second inner end has a protrusion portion slidably engageable within the receiving cavity of the first connector. The second outer end attaches to a second hose. A pair of locking pins is coupled to the second sidewall to selectively engage the female bracket distal end of the female clamp bracket.

11 Claims, 7 Drawing Sheets

(56) References Cited

U.S. PATENT DOCUMENTS

| | | | |
|---|---|---|---|
| 3,409,316 A | | 11/1968 | Jewell |
| 3,664,375 A | * | 5/1972 | Marette ................... F16L 37/20 137/614.04 |
| 4,618,171 A | | 10/1986 | Fahl |
| D325,961 S | | 3/1992 | Hayes |
| 6,015,168 A | | 1/2000 | Fahl |
| 6,089,619 A | | 7/2000 | Goda |
| 10,001,237 B1 | | 6/2018 | Lee |
| 2010/0270791 A1 | | 10/2010 | Lee |

* cited by examiner

US 11,428,356 B2

HOSE CONNECTOR APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hose connector devices and more particularly pertains to a new hose connector device for quick and easy dripless hose connection. The present invention includes a pair of threaded attachments to easily connect to two standard hoses. There is also a single cam system to quickly and securely connect or disconnect the pair of attachments.

(2) Description of Related Art Including Information Disclosed Under 37 CFR 1.97 and 1.98

The prior art relates to hose connector devices. Known devices utilizing cam mechanisms typically employ two cams rather than a single cam. Known devices also lack a pair of attachments that can be threaded onto two standard hoses and then joined with a press fit secured by the cam.

BRIEF SUMMARY OF THE INVENTION

An embodiment of the disclosure meets the needs presented above by generally comprising a first connector having a first inner end, a first outer end, and a first sidewall. The first outer end is threaded and configured to attach to a first hose. The first inner end has a receiving cavity. A gasket is coupled to the first connector within the receiving cavity. A male clamp bracket is coupled to the first connector. The male clamp bracket is pivotably coupled to the first sidewall. A female clamp bracket is coupled to the male clamp bracket. The female clamp bracket is pivotably coupled to the male clamp bracket and has a female bracket distal end. A second connector has a second inner end, a second outer end, and a second sidewall. The second inner end has a protrusion portion slidably engageable within the receiving cavity of the first connector. The second outer end is threaded and configured to attach to a second hose. An O-ring is coupled to the second connector around the protrusion portion. A pair of locking pins is coupled to the second connector. The pair of locking pins is coupled to the second sidewall to selectively engage the female bracket distal end of the female clamp bracket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
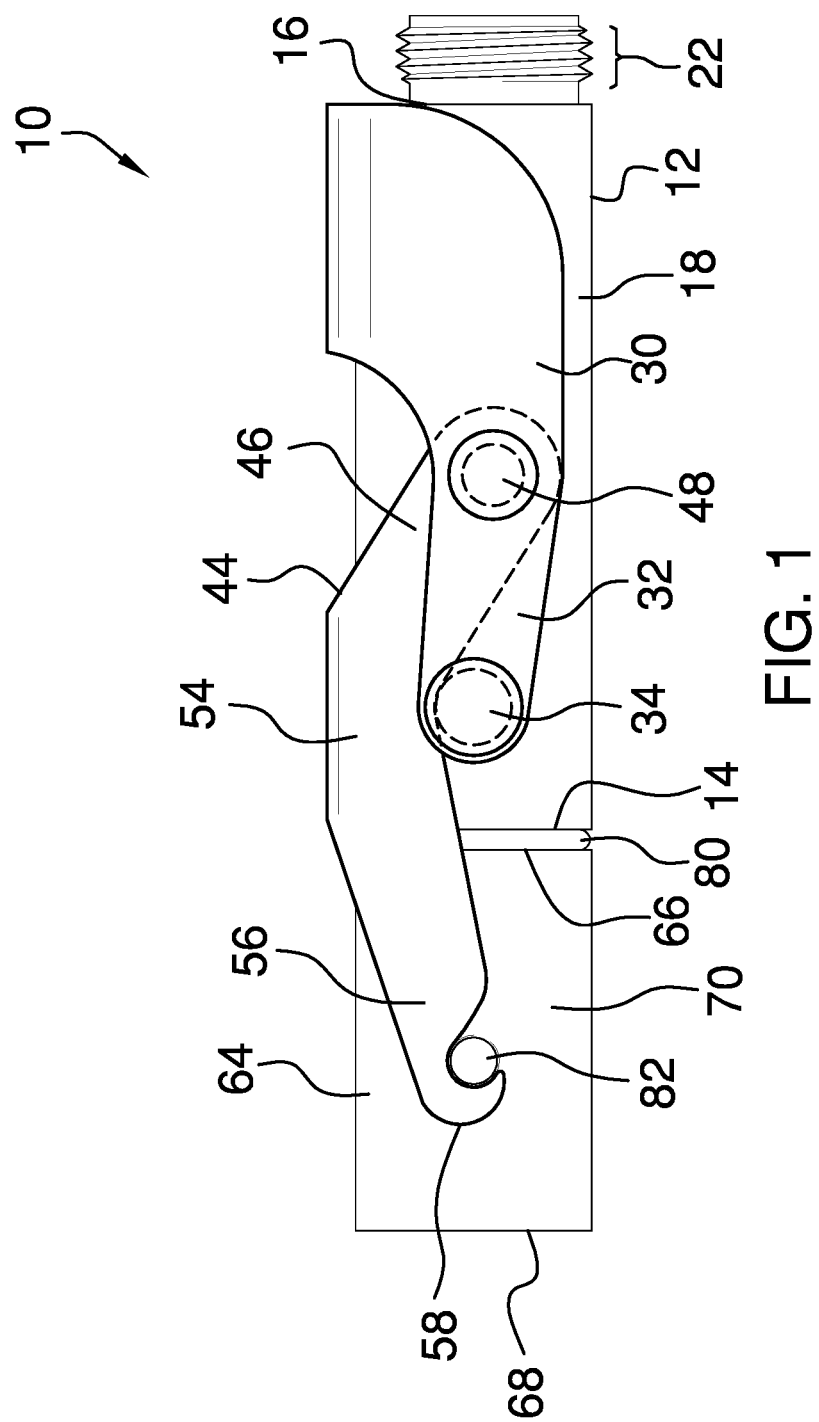
FIG. 1 is a side elevation view of a hose connector apparatus according to an embodiment of the disclosure.
Figure 2:
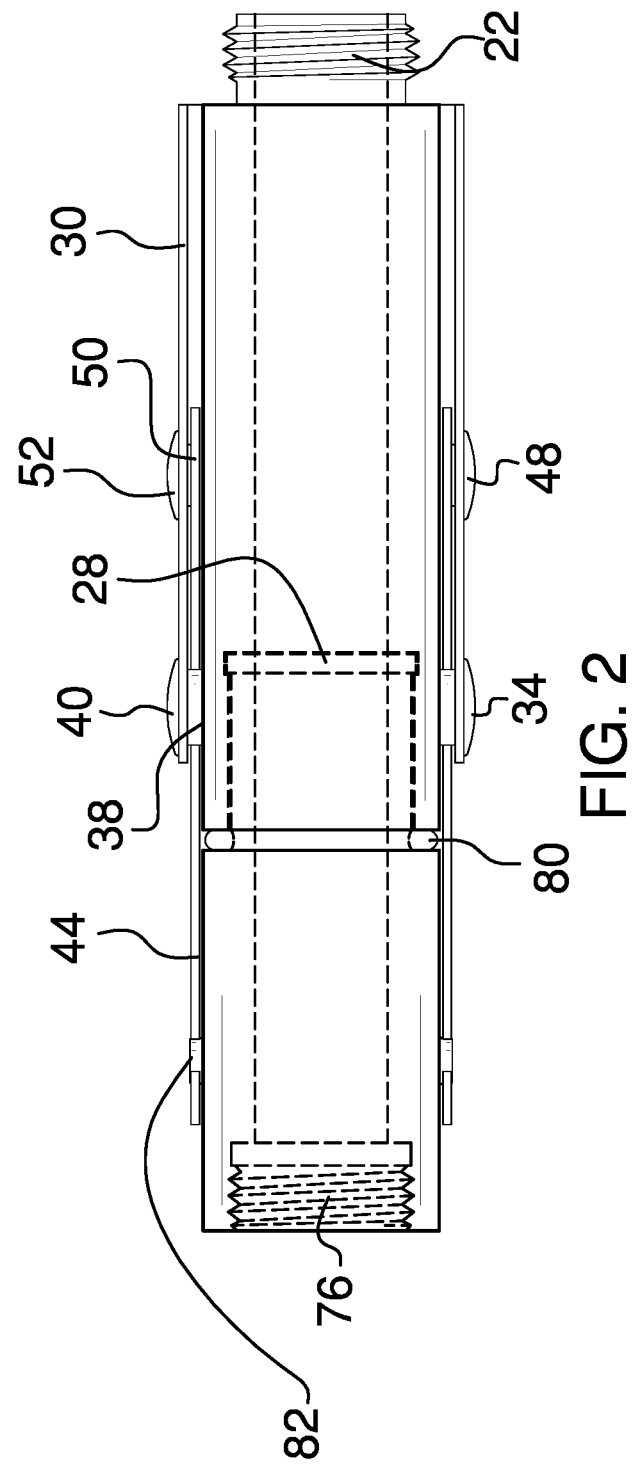
FIG. 2 is a bottom plan view of an embodiment of the disclosure.
Figure 3:
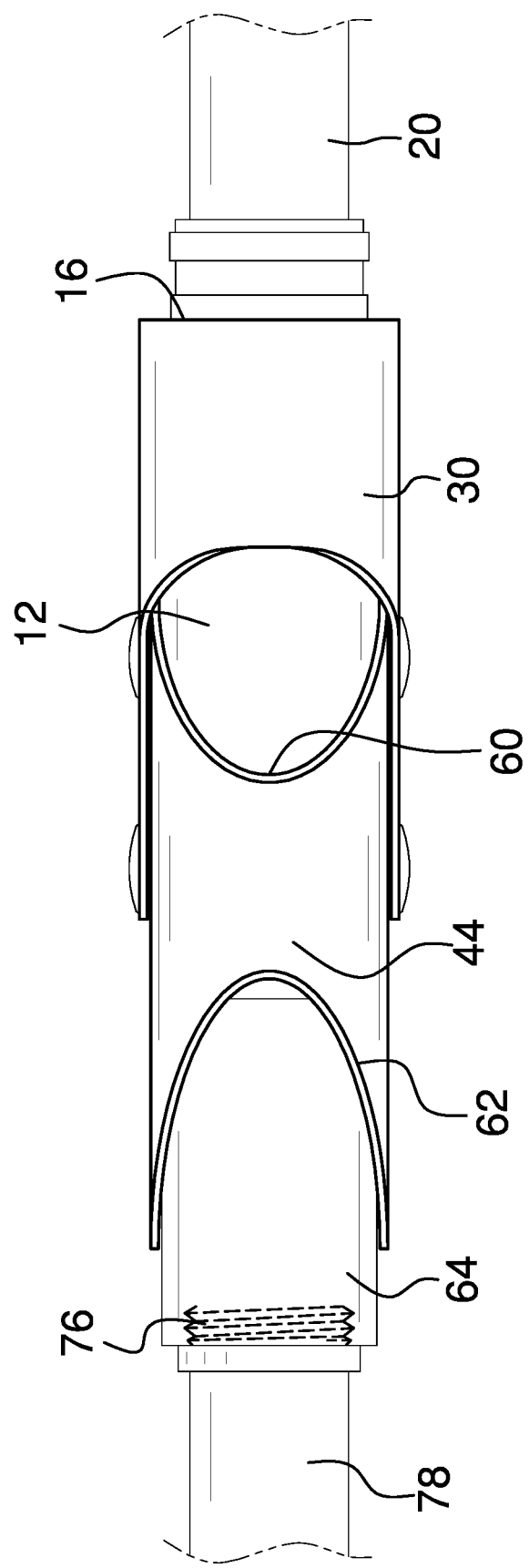
FIG. 3 is a top plan view of an embodiment of the disclosure.
Figure 4:
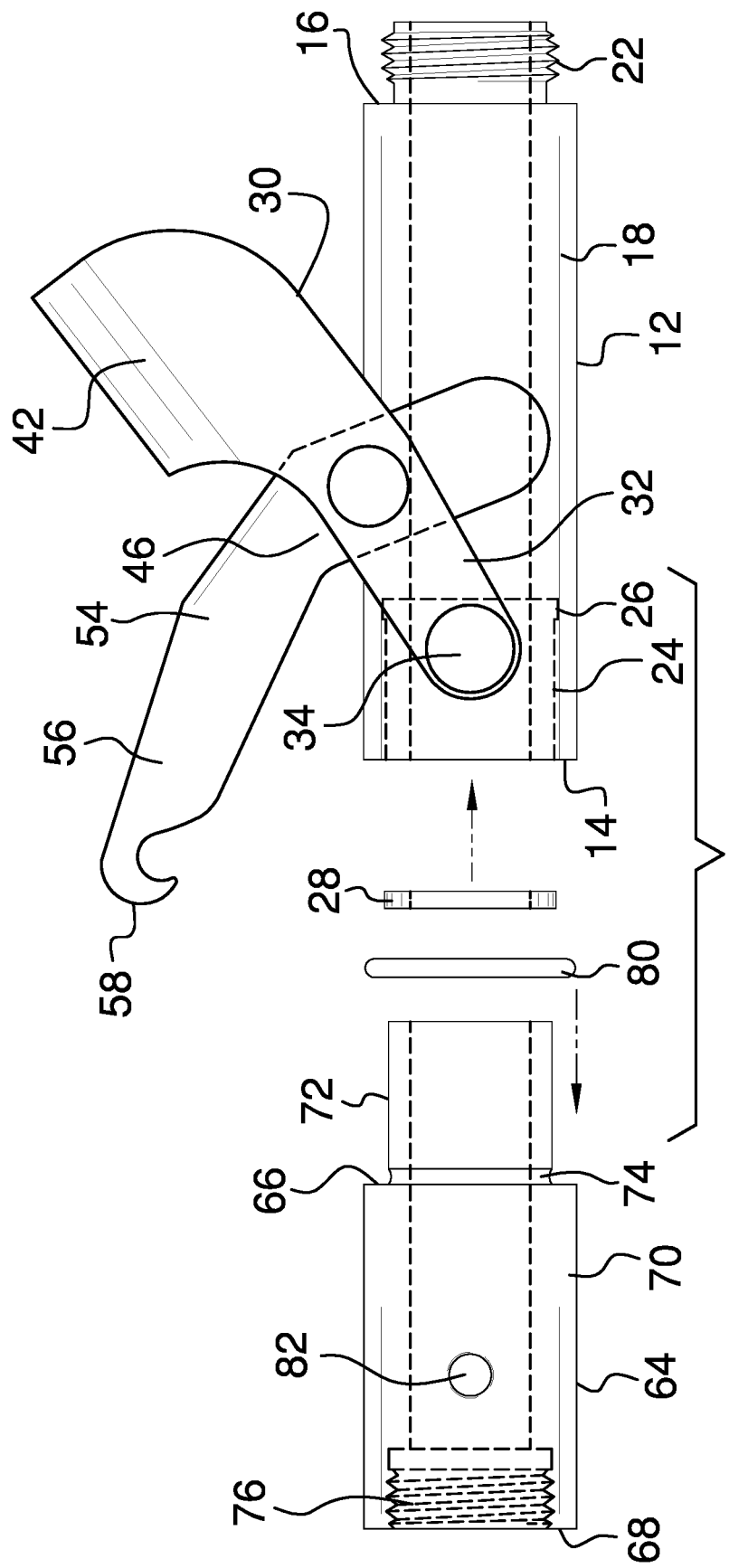
FIG. 4 is an exploded view of an embodiment of the disclosure.
Figure 5:
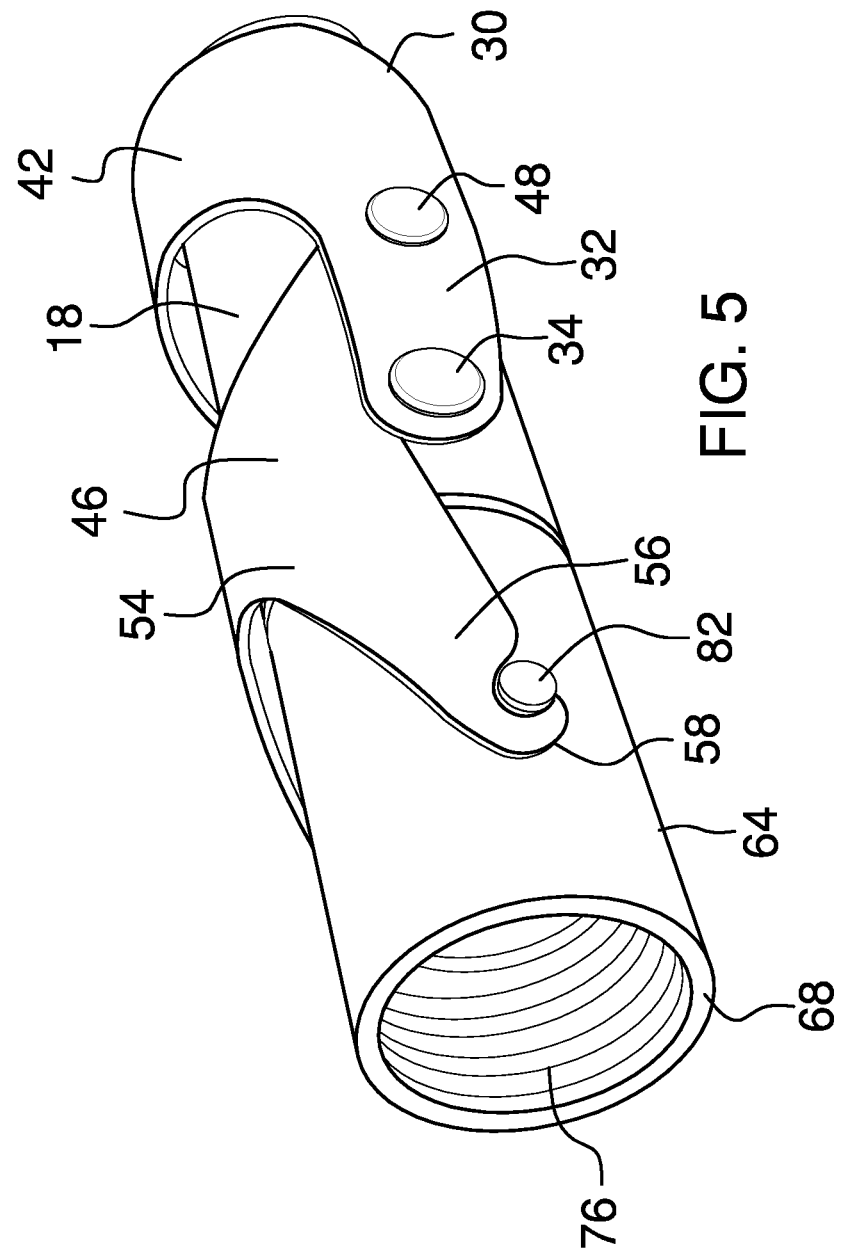
FIG. 5 is an isometric view of an embodiment of the disclosure.

With reference now to the drawings, and in particular to FIGS. 1 through 7 thereof, a new hose connector device embodying the principles and concepts of an embodiment of the disclosure and generally designated by the reference numeral 10 will be described.

As best illustrated in FIGS. 1 through 7, the hose connector apparatus 10 generally comprises a first connector 12 having a first inner end 14, a first outer end 16, and a first sidewall 18. The first outer end 16 is threaded and configured to attach to a first hose 20. The first outer end 16 may include a male threaded portion 22. The first inner end 14 has a receiving cavity 24. The receiving cavity 24 may have a flared portion 26. A gasket 28 is coupled to the first connector 12 within the flared portion 26 of the receiving cavity.

A male clamp bracket 30 is coupled to the first connector 12. The male clamp bracket 30 is pivotably coupled to the first sidewall 18. The male clamp bracket 30 may have a pair of male ears 32 pivotably coupled to a pair of primary hinges 34 coupled to the first sidewall 18. Each of the primary hinges 34 may have a fixed primary shaft portion 38 and a primary cap portion 40 to prevent disengagement of the male ears 32. The male clamp bracket 30 has a male body portion 42 conforming to the curvature of the first sidewall 18.

A female clamp bracket 44 is coupled to the male clamp bracket 30. The female clamp bracket 44 has a pair of female ears 46 pivotably coupled to a pair of secondary hinges 48 coupled to the pair of male ears 32 adjacent the male body portion 42. Each of the secondary hinges 48 may have a secondary shaft portion 50 and a secondary cap portion 52. The female clamp bracket 44 has a female body portion 54 conforming to the curvature of the first sidewall 18 and a pair of female arm portions 56 extending from the female body portion 54. The female clamp bracket 44 has a female bracket distal end 58. The female bracket distal end 58 of each of the female arm portions may be hooked. A female ear edge 60 between the pair of female ears and a female arm edge 62 between the pair of female arm portions may both have parabolic profiles best seen in FIG. 3.

A second connector 64 has a second inner end 66, a second outer end 68, and a second sidewall 70. The second inner end 66 has a protrusion portion 72 having a ring groove 74. The protrusion portion 72 is slidably engageable within the receiving cavity 24 of the first connector. The second outer end 68 may include a female threaded recessed portion 76 configured to attach to a second hose 78. An O-ring 80 is coupled to the second connector 64. The O-ring 80 is coupled around the protrusion portion 72 and selectively engageable with the ring groove 74.

A pair of locking pins 82 is coupled to the second connector 64. The pair of locking pins 82 is coupled to the second sidewall 70 to selectively engage the female bracket distal end 58 of the female clamp bracket. Each locking pin 82 may be spaced 180° around the second sidewall 70.

Figure 6:
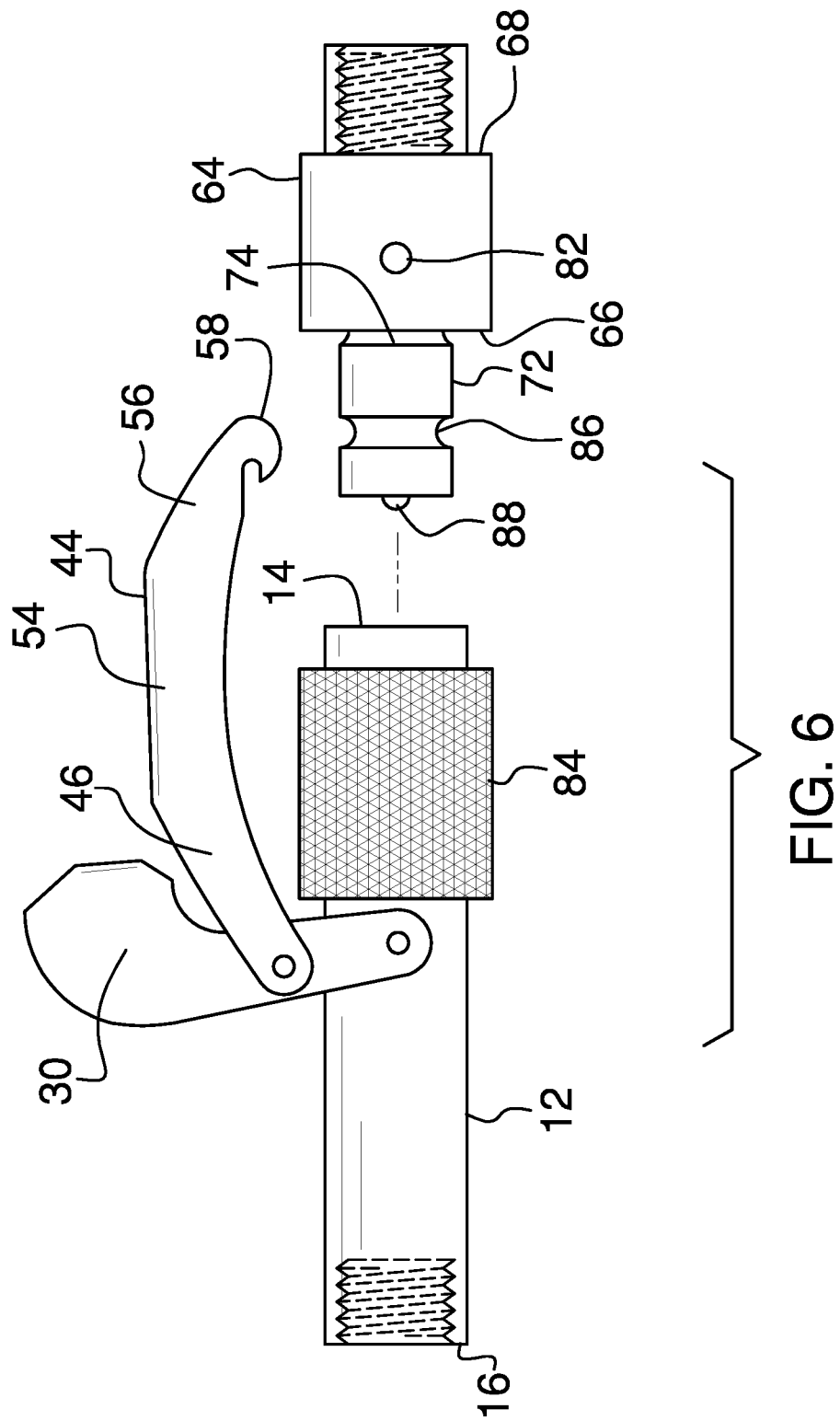
FIG. 6 is a side elevation view of an embodiment of the disclosure.
Figure 7:
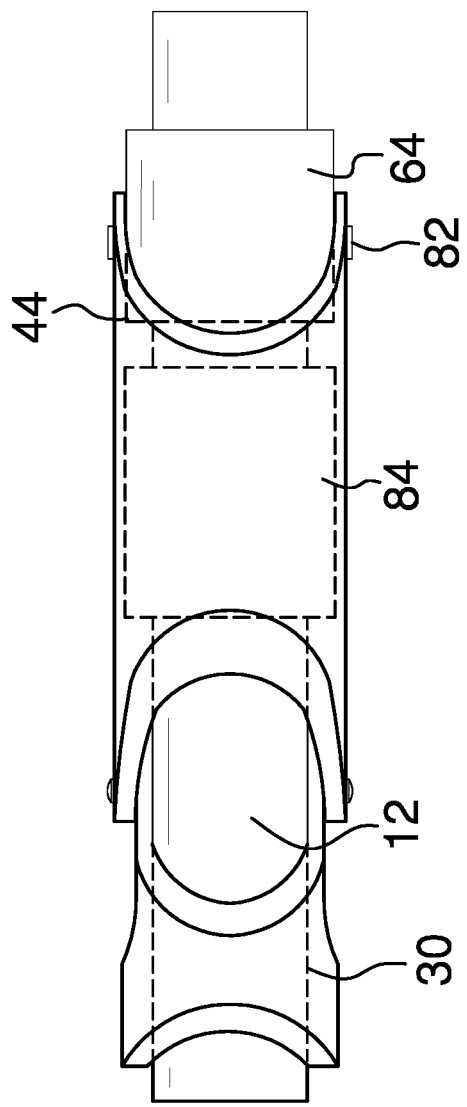
FIG. 7 is a top plan view of an embodiment of the disclosure.

As shown in FIGS. 6 and 7, a locking collar 84 may be coupled to the first sidewall 18 proximal the first inner end 14. The protrusion portion 72 of the second inner end may have an engagement channel 86 and a ball tip 88 in operational communication with the locking collar 84 to create a quick release mechanism. The locking collar 84 may be knurled for improved grip.

In use, the protrusion portion 72 is engaged within the receiving cavity 24 of the first connector. The hooked female bracket distal end 58 is engaged around the pair of locking pins 82 and the male clamp bracket 30 is pivoted to position the male body portion 42 adjacent the first sidewall 18, pulling the female clamp bracket 44 and engaging the protrusion portion against the gasket 28 to create a tight seal. The O-ring 80 further prevents fluid leakage whether the first hose 20 and second hose 78 are carrying a liquid or gas.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hose connector apparatus comprising:
    a first connector having a first inner end, a first outer end, and a first sidewall, the first outer end being threaded and configured to attach to a first hose, the first inner end having a receiving cavity;
    a gasket coupled to the first connector, the gasket being coupled within the receiving cavity;
    a male clamp bracket coupled to the first connector, the male clamp bracket being pivotably coupled to the first sidewall;
    a female clamp bracket coupled to the male clamp bracket, the female clamp bracket being pivotably coupled to the male clamp bracket and having a female bracket distal end;
    a second connector having a second inner end, a second outer end, and a second sidewall, the second inner end having a protrusion portion, the protrusion portion being slidably engageable within the receiving cavity of the first connector, the second outer end being threaded and configured to attach to a second hose;
    an O-ring coupled to the second connector, the O-ring being coupled around the protrusion portion;
    a pair of locking pins coupled to the second connector, the pair of locking pins being coupled to the second sidewall to selectively engage the female bracket distal end of the female clamp bracket; and
    a locking collar coupled to the first sidewall proximal the first inner end; the protrusion portion of the second inner end being in operational communication with the locking collar.

2. The hose connector apparatus of claim 1 further comprising the first outer end including a male threaded portion; the second outer end including a female threaded recessed portion.

3. The hose connector apparatus of claim 1 further comprising the protrusion portion of the second inner end having a ring groove, the O-ring being selectively engageable with the ring groove.

4. The hose connector apparatus of claim 1 further comprising the male clamp bracket having a pair of male ears pivotably coupled to the first sidewall and a male body portion conforming to the curvature of the first sidewall.

5. The hose connector apparatus of claim 4 further comprising the female clamp bracket having a pair of female ears pivotably coupled to the pair of male ears, a female body portion conforming to the curvature of the first sidewall, and a pair of female arm portions extending from the female body portion, the female bracket distal end of each of the female arm portions being hooked.

6. The hose connector apparatus of claim 5 further comprising the pair of male ears being pivotably coupled to a pair of primary hinges coupled to the first sidewall, each of the primary hinges having a primary shaft portion and a primary cap portion.

7. The hose connector apparatus of claim 6 further comprising the pair of female ears being pivotably coupled to a pair of secondary hinges coupled to the pair of male ears adjacent the male body portion, each of the secondary hinges having a secondary shaft portion and a secondary cap portion.

8. The hose connector apparatus of claim 1 further comprising the receiving cavity of the first inner end having a flared portion to receive the gasket.

9. The hose connector apparatus of claim 1 further comprising the locking collar being knurled.

10. The hose connector apparatus of claim 1 further comprising the protrusion portion of the second inner end having an engagement channel and a ball tip in operational communication with the locking collar.

11. A hose connector apparatus comprising:
- a first connector having a first inner end, a first outer end, and a first sidewall, the first outer end being threaded and configured to attach to a first hose, the first inner end having a receiving cavity, the first outer end including a male threaded portion, the receiving cavity of the first inner end having a flared portion;
- a gasket coupled to the first connector, the gasket being coupled within the receiving cavity within the flared portion;
- a male clamp bracket coupled to the first connector, the male clamp bracket being pivotably coupled to the first sidewall, the male clamp bracket having a pair of male ears pivotably coupled to a pair of primary hinges coupled to the first sidewalk, each of the primary hinges having a primary shall portion and a primary cap portion, the male clamp bracket having a male body portion conforming to the curvature of the first sidewall;
- a female clamp bracket coupled to the male clamp bracket, the female clamp bracket having a pair of female ears, the pair of female ears being pivotably coupled to a pair of secondary hinges coupled to the pair of male ears adjacent the male body portion, each of the secondary hinges having a secondary shaft portion and a secondary cap portion, the female clamp bracket having a female body portion conforming to the curvature of the first sidewall, and a pair of female arm portions extending from the female body portion, the female clamp bracket having a female bracket distal end, the female bracket distal end of each of the female arm portions being hooked;
- a second connector having a second inner end, a second outer end, and a second sidewall, the second inner end having a protrusion portion, the protrusion portion of the second inner end having a ring groove, the protrusion portion being slidably engageable within the receiving cavity of the first connector, the second outer end including a female threaded recessed portion configured to attach to a second hose, the protrusion portion having an engagement channel and a ball tip in operational communication with a locking collar;
- an O-ring coupled to the second connector, the O-ring being coupled around the protrusion portion and selectively engageable with the ring groove;
- a pair of locking pins coupled to the second connector, the pair of locking pins being coupled to the second sidewall to selectively engage the female bracket distal end of the female clamp bracket; and
- the locking collar coupled to the first sidewall proximal the first inner end, the engagement channel and the ball tip of the protrusion portion of the second inner end being in operational communication with the locking collar, the locking collar being knurled.

\* \* \* \* \*